Dec. 12, 1967   H. T. PRESTIGE   3,357,081
METHOD FOR INSERTING INSERTS THROUGH SOLID BODIES
Filed March 19, 1962   6 Sheets-Sheet 2
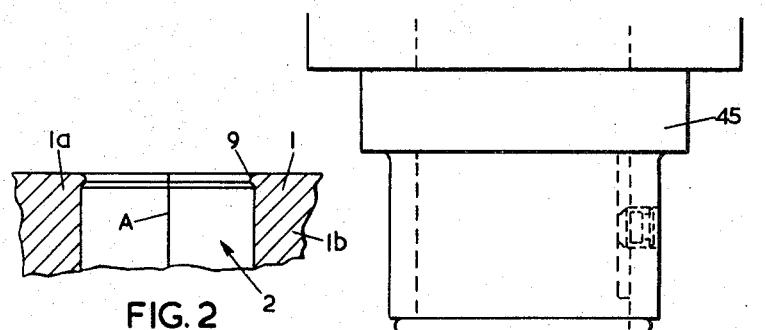
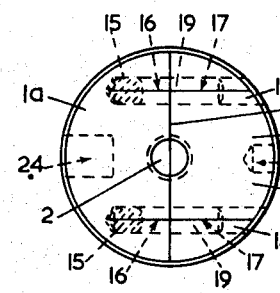
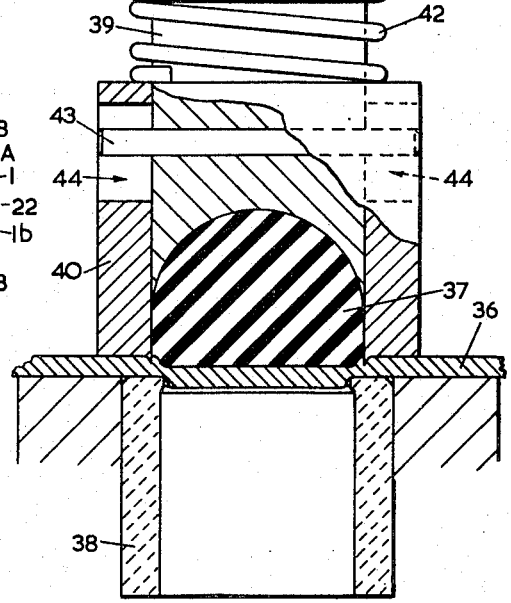
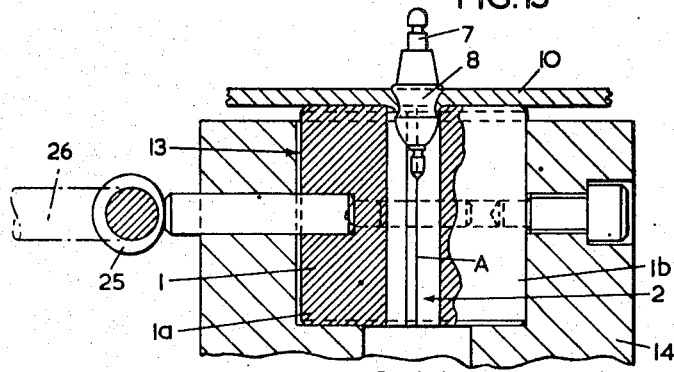
INVENTOR
H. T. Prestige
ATTORNEYS INVENTOR
H. T. Prestige

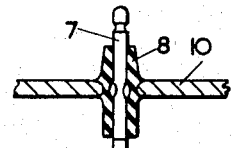
FIG. 9
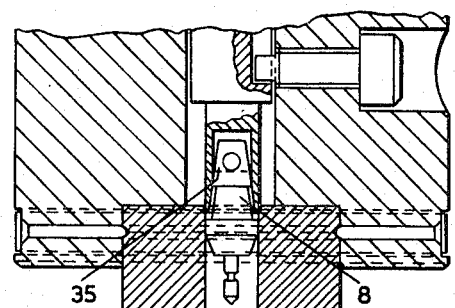
FIG. 6
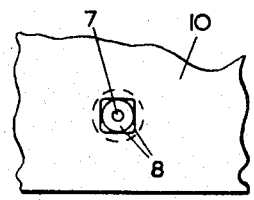
FIG. 10
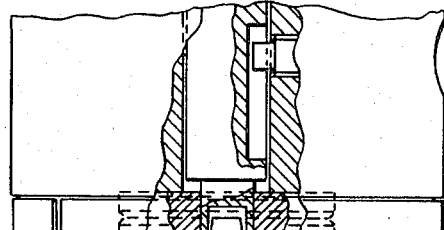
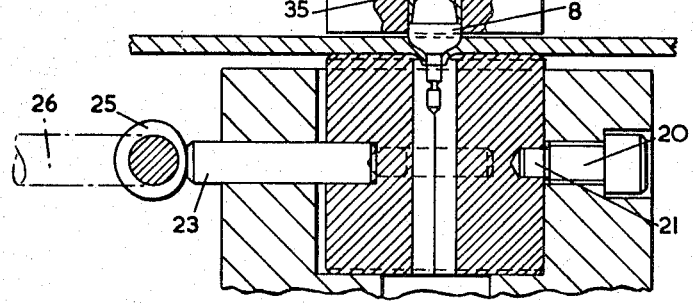
FIG. 7
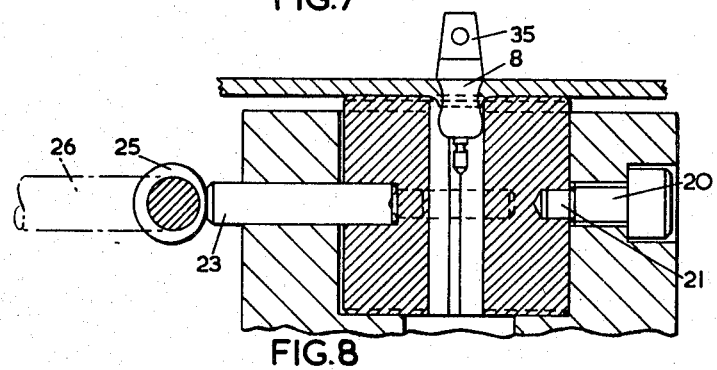
FIG. 8
INVENTOR
H. T. Prestige
ATTORNEYS

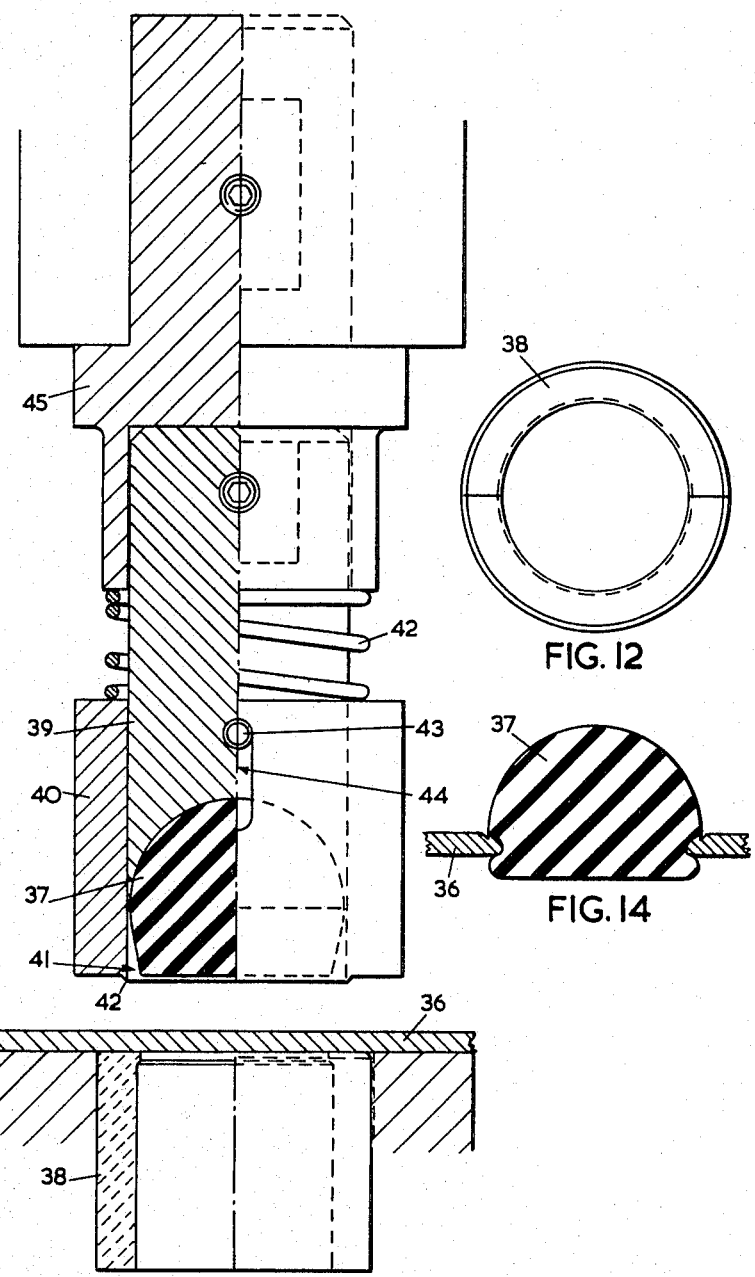

Dec. 12, 1967     H. T. PRESTIGE     3,357,081
METHOD FOR INSERTING INSERTS THROUGH SOLID BODIES
Filed March 19, 1962     6 Sheets-Sheet 6

INVENTOR
H. T. Prestige
By Holcombe Wetherill & Brunhes
ATTORNEYS

United States Patent Office 3,357,081
Patented Dec. 12, 1967

3,357,081
METHOD FOR INSERTING INSERTS THROUGH SOLID BODIES
Harry Thomas Prestige, Dartford, England, assignor to J & S Engineers Limited
Filed Mar. 19, 1962, Ser. No. 180,742
Claims priority, application Great Britain, Mar. 23, 1961, 10,752/61
18 Claims. (Cl. 29—155)

This invention relates to methods of and apparatus for inserting inserts through solid bodies. A particular aspect of the invention concerns the insertion of relatively soft inserts through relatively hard bodies.

According to one aspect, the invention provides a method of inserting an insert into an imperforate sheet of material, in which the insert is located between a ram and a die, said sheet is located between the insert and the die, and an insert shrouding member is located between said sheet and said ram, said shrouding member having a bore therethrough through which the insert may pass and in which the ram is a sliding fit and the end face of said ram having a shape complementary to that of the adjacent surface of the insert, applying pressure between said shrouding member and said die to produce a sealing contact between the shrouding member and said sheet, and applying pressure between said ram and said die to compress said insert within the bore of the shrouding member so as to press out a piece of said sheet into the die, part of said insert thereafter passing through the aperture left by the pressed-out piece of material whilst said adjacent surface of the insert substantially retains its original shape.

According to another aspect, the invention provides apparatus for carrying out the above method comprising a ram, a die having a bore aperture coaxial with said ram, an insert shrouding member located between the ram and the die and having a through-bore within which said ram is a sliding fit.

In order that the invention may be the more clearly understood a number of embodiments thereof will now be described, reference being made to the drawings accompanying the Provisional Specification, and to the accompanying drawings wherein:

FIGURE 2 is a fragmentary view to a larger scale of a part of FIGURE 1.

FIGURE 4 is a plan of a part of FIGURES 1 and 3.

FIGURE 5 is a similar view to FIGURES 1 and 3 of a portion of said apparatus, when at the final stage of the operating cycle.

Figure 1:
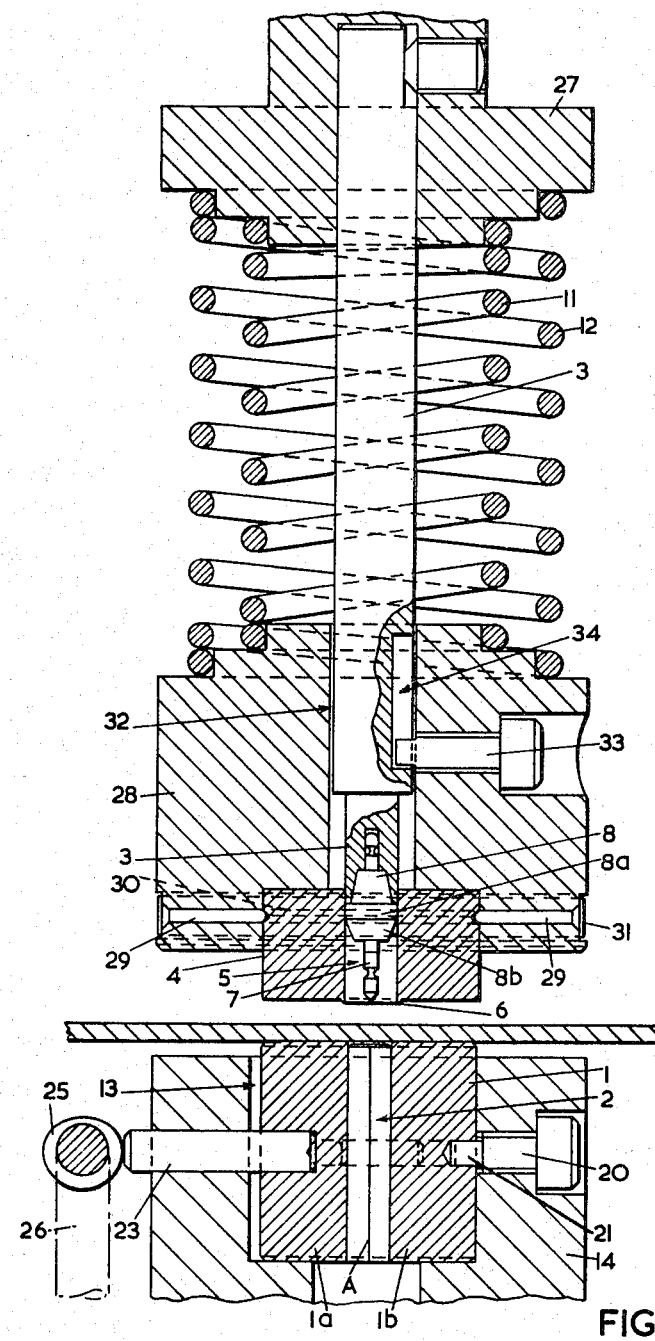
FIGURE 1 is a sectional side elevation of an apparatus for inserting, into a metal plate, an electric conductor surrounded by a relatively soft insulating bush, said apparatus being at the starting stage of the operating cycle.

FIGURE 6 as a view corresponding to FIGURE 1 illustrating a modification of the apparatus of FIGURES 1 to 5.

Figure 3:
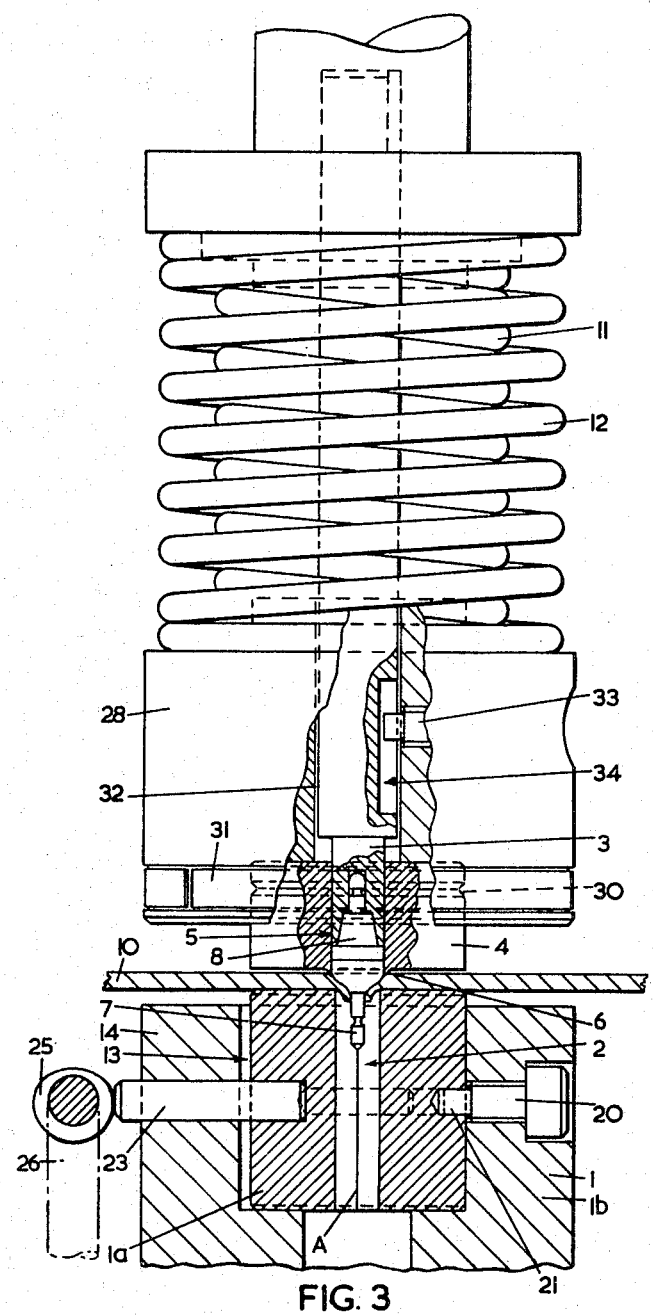
FIGURE 3 is a similar view to FIGURE 1 of said apparatus, when at an intermediate stage of the operating cycle.

FIGURE 7 is a view corresponding to FIGURE 3 illustrating the same modification.

FIGURE 8 is a view corresponding to FIGURE 5 illustrating the same modification.

FIGURE 9 is an elevation of the end product produced by another modification of the apparatus of FIGURES 1 to 5.

FIGURE 10 is a plan of the same.

FIGURE 11 is a part sectional side elevation of an apparatus for inserting into a metal plate, a rubber pad adapted to form a supporting foot for a piece of apparatus of which said plate constitutes the bottom, said apparatus being at the starting stage of the operating cycle.

FIGURE 12 is a plan of a portion of said apparatus.

FIGURE 13 is a similar view to FIGURE 1, with the apparatus at an intermediate stage of the operating cycle.

FIGURE 14 is a sectional side elevation of the end product produced by the apparatus of FIGURES 11 to 13, and in the accompanying drawings.

Figures 15, 16:
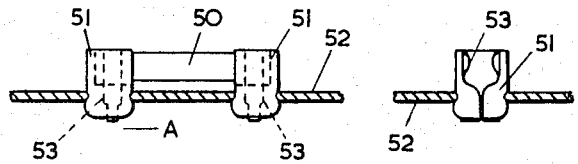

FIGURE 15 is an elevation of a fuse holder assembly.

FIGURE 16 is a view in the direction of arrow A in FIGURE 15.

Figure 17:
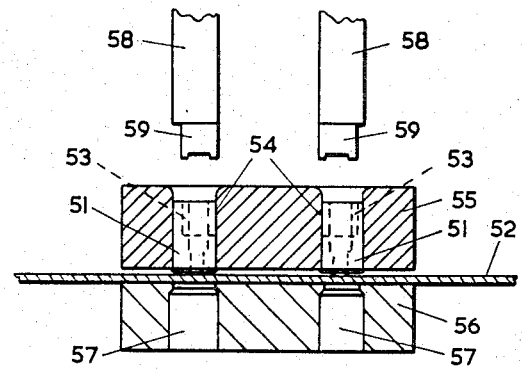
Figure 18:
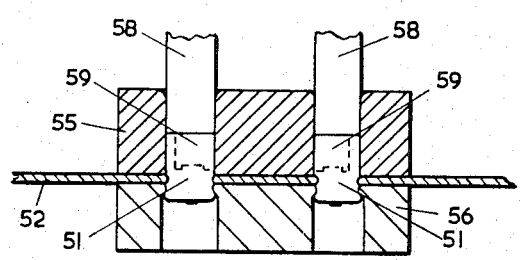

FIGURE 17 is a scrap elevation of apparatus for forming the assembly of FIGURE 15, said apparatus being shown at the commencement of the operating cycle; and FIGURE 18 is a scrap elevation similar to FIGURE 17, with the apparatus at the end of the insertion stroke.

Referring first to FIGURES 1 to 5, these figures illustrate an apparatus for producing an assembly which consists of a metal plate with an electric conductor passing therethrough and insulated therefrom by means of an insulating bush.

The apparatus comprises a die 1 with a flat horizontal upper surface, said die having a vertical die hole 2 passing through it. Vertically above said die 1 is an assembly comprising a vertical circular-section ram 3, which is coaxial with said die hole 2, and an insert shrouding member or keep block 4 which has a vertical circular-section bore hole 5 through it which is also coaxial with said die hole. The ram 3 makes a close sliding fit in the bore hole 5, and, at the normal or starting position shown in FIGURE 1, the lower extremity of said ram extends just into the upper end of said bore hole 5. The bottom surface of the shrouding member 4 is flat and horizontal, except that a fairly sharp peripheral rim or lip 6 on said bottom surface surrounds the bottom end of said bore hole 5.

The conductor is designated by the reference 7 and the insulating bush by the reference 8, the two parts forming a composite insert. These two parts 7 and 8 are pre-assembled with the conductor 7 passing coaxially through the bush 8 and projecting at both ends. The conductor 7 and bush 8 are both of circular section and are shaped at clearly shown in FIGURE 1. The conductor or the bush may be of rectangular section if desired.

The lower end of the ram 3 is formed coaxially, as shown in FIGURE 1, with a circular section cavity which has a complementary shape to that of the adjacent upper end surface of the insert. The upper portion of the insert 7, 8 makes a close fit in this cavity, with the lower portion of said insert extending downwards beyond the lower end of said ram 3 and, at the normal or starting position shown in FIGURE 1, said lower portion lies wholly within the bore hole 5 with the part 8a of the bush making a close fit in said bore hole 5, the part 8b beneath said part 8a being tapered.

It will be seen that the bore hole 5 is of greater diameter than the die hole 2 and that, as best shown in FIGURE 2, the diameter of said die hole 2 is slightly reduced at 9 adjacent its aperture.

The plate is designated by the reference 10. This is initially imperforate, that is to say without any hole to receive the insert. At starting, said plate 10 is laid flat on the top of the die 1 as shown in FIGURE 1.

In the present embodiment of the invention the plate 10 is of aluminium; the conductor 7 is of mild steel, and the bush 8 is of nylon. The die 1 and the shrouding member 4 are both of tool steel.

As will be hereinatfer more particularly described, the shrouding member 4 is biased downwards to a limiting position relative to the ram 3, by means of two heavy helical springs 11 and 12.

In operation, the insert and the plate 10 having been disposed as shown in FIGURE 1, the ram 3 is moved vertically downwards, and carries the shrouding member 4 downwards with it. First the bottom surface of said shrouding member engages the top surface of the plate 10. Said shrouding member is accordingly arrested and the ram 3 continues to descend in opposition to the pressure of the springs 11, 12. As said springs 11, 12 are heavy, the shrouding member 4 exerts considerable thrust on the plate 10 and, as this thrust is taken by the narrow lip 6, the pressure density is high and an effective seal is formed between said lip and the surface of said plate. Indeed, the lip may bite into the surface of said plate.

Said ram 3, as it continues to descend, carries the insert with it, and the lower end of the conductor 7 is driven through the plate 10, forming a small hole for itself in said plate 10, which hole is, of course, maintained closed by said conductor. Next the lower end of the bush 8 engages the upper surface of the plate, and, as the ram 3 continues to descend, it is believed that the portion of the bush which is beneath the lower end of said ram flows, in the manner of a liquid, until it is compressed to fill the space, within the bore hole 5, which is beneath the lower end of said ram 3 and above the upper surface of the plate 10. As the ram 3 still continues to descend, it is believed that the pressure exerted hydrostatically by the said portion of the bush behaving as a liquid, causes a disc-shaped piece to be sheared out from said plate into the die hole 2, through which it falls. The hydrostatic pressure is now relieved, and it appears that the lower portion of the bush, now behaving in its normal manner as a resilient body, is forced through the hole in the plate left by said disc-shaped piece and into the relatively small die hole 2. FIGURE 3 shows the position of the parts and the shape of said lower bush portion just before the disc-shaped piece is sheared out of the plate 10. FIGURE 5 shows the final shape of the said lower bush portion after it has been forced into the die hole 2 and after the ram 3 has ceased its descent (at the position at which its lower end is just above the upper surface of the plate 10), and has been withdrawn upwards. It will be seen that the hole in the plate 10 and the portion of the bush within said hole are tapered so that the bush cannot ordinarily be pushed further downwards, and that the key formed by the reduced die part 9 (FIGURE 2) prevents the bush from being pulled upwards through said hole in the plate.

It may be pointed out, at this stage, that in FIGURE 5 the die hole 2 has been opened, by leftwards movement of the left-hand portion of the die 1 to enable the bush, together with the plate 10, to be lifted out of said die hole. The means for doing this will be described hereinafter.

Describing now certain constructional features, the die 1 is mounted in a recess 13 in a fixed die holder 14. Said die is divided, in a vertical plane A extending radially of the die axis, into two parts 1a and 1b. Said recess 13 fits said die 1 so as to maintain said two parts 1a and 1b accurately together, except that said recess is slightly elongated horizontally so as to allow said parts 1a and 1b to move a small distance horizontally away from each other, in a direction at right angles to said vertical plane, so as to permit the bush 8 to be removed from the die hole 2.

Said parts 1a and 1b are biased away from each other, and means are provided for maintaining said parts together during the down or operative stroke of the ram 3 and for releasing them for movement apart after said ram 3 has made its up stroke. Thus the means for biasing said parts 1a, 1b away from each other comprise two rubber pads 15 (FIGURE 4). These are located respectively in the ends of two holes 16 bored at right angles to said plane A into the part 1a. Two similar holes 17 in line with the holes 16 are bored through the part 1b. In practice each pair of holes 17, 16 is formed by one boring, each hole 17 being plugged by a plug 18 as shown. A rod 19 is fitted into each pair of holes 16, 17 so that it abuts at one end against the rubber pad 15 and at the other end against the plug 18, and the arrangement is such that when the two parts 1a and 1b are held together the pads 15 are compressed and that when said parts are released said pads force them apart.

When the die 1 is fitted into the recess 13, the part 1b is located by means of a screw 20 screwed radially into a hole through the wall of the die holder at right angles to the plane A, said screw having a projecting end portion 21 which fits in a hole 22 (FIGURE 4) in said part 1b. The part 1a is located by means of a rod 23 which passes diametrically oppositely to the screw 20 through a hole through the wall of the die holder 14 and into a hole 24 in the part 1a. The outer end of said rod 23 engages the cam surface of a cam 25 controlled by a lever 26. When said cam is at the position shown in FIGURE 1 the rod 23 presses the part 1a hard against the part 1b and when said cam is at the position shown at FIGURE 5 the rubber pads 15 are free to force the part 1a away from the part 1b as shown.

The vertical reciprocation of the ram 3 is effected through the medium of a head 27 to which the upper end of said rod is secured. The shrouding member 4 has its upper portion fitting in a recess in the bottom end of a carrier 28, and said shrouding member is removably attached to said carrier by means of a number of radial pins 29 passing through the wall of said carrier and having rounded ends which engage in a circumferential groove 30 around said shrouding member, said pins being yieldably retained by means of a split spring clip 31 passing circumferentially around said carrier. Thus said shrouding member 4 can be readily pulled from said carrier 28 and will click back into place.

The ram 3 passes through a bore hole 32 in the carrier 28, and a screw 33 screws radially through a hole in said carrier and has an end portion which engages in a vertical slot 34 in said ram 3. The springs 11 and 12 are in compression between the head 27 and the carrier 28, and thus said carrier is biased downwards relative to said ram 3 to the position at which the end of said screw 33 engages the lower end of said slot 34. In this way, as aforesaid the shrouding member 4 is biased downwards relative to the ram 3 to a limiting position.

It will be obvious that other materials than nylon may be employed for the bush 8, for example, polytetrafluoroethylene or polypropylene.

In the above described embodiment of the invention the condutcor 7 is adapted to be soldered, or otherwise permanently attached, to conducting leads on each side of the plate 10. In a slightly modified embodiment of the invention a conductor is employed, in place of the conductor 7, whose upper projecting portion is formed as a screw terminal. This calls for a modification in the shape of the recess in the lower end of the ram 3 so that said recess is adapted to accommodate the screw terminal. FIGURES 6, 7 and 8 illustrate such a modification, FIGURE 6 corresponding to FIGURE 1, FIGURE 7 to FIGURE 3 and FIGURE 8 to FIGURE 5. The reference 35 designates the screw terminal, and it will be seen that the recess in the lower end of the ram 3 is differently shaped from that of FIGURE 3. Also, as shown in FIGURE 8, the final shape of the bush 8 is somewhat different from that of FIGURE 5. In other respects the arrangement is similar to that of FIGURES 1 to 5.

The arrangement of FIGURES 1 to 5 may also be modified in that the die aperture instead of being of circular section is of square section. In this modification the insert is exactly the same initially as in the embodiment of FIGURES 1 to 5 and the modified apparatus differs from said embodiment only in that, as stated, the die aperture is of square section. As in FIGURES 1 to 5, said aperture is of considerably smaller cross section than the bore hole 5.

In consequence of the die aperture being of square cross section the hole which is punched out of the plate 10 is also square. (To be precise, the upper periphery of the hole is circular and the lower periphery square, the hole walls merging from one shape to the other within the thickness of the plate 10.) The portion of the bush 8 which is above said square hole remains of circular cross section, but the portion of said bush which is within and beneath said square hole becomes formed to square cross section as it is forced through said plate hole and into the die aperture. Consequently it is impossible to rotate said bush in said plate hole. FIGURE 9 is a sectional elevation, and FIGURE 10 a plan of the final assembly of the conductor and bush in a square hole in the plate 10.

Obviously non-circular sections other than square can be employed.

Referring now to FIGURES 11 to 14, these figures illustrate an apparatus for producing an assembly consisting of a metal plate 36 with an insert in the form of a rubber pad 37 passing through a hole in said plate and keying therewith. In the particular arrangement illustrated the plate 36 constitutes the bottom of a telephone receiver and the insert 37 forms a supporting foot for said telephone receiver.

This apparatus operates in essentially the same manner as the apparatus of FIGURES 1 to 5. The apparatus consists of a die 38 which is similar to the die 1 except that it has a larger die hole. Vertically above said die 38 is an assembly comprising a vertical circular section ram 39 which is coaxial with said die hole 2 and shrouding member 40 which has a vertical circular-section bore hole 41, which is also coaxial with said die hole, and in which the vertical ram 39 makes a close sliding fit. Similarly to the embodiment of FIGURES 1 to 5, the shrouding member 40 has a sharp lip 42 surrounding the bottom end of the bore hole 41.

The insert 37, as clearly shown, is in the shape of a hemisphere with a short truncated cone extending from its end of maximum diameter. The ram 39 is of the same diameter as the maximum diameter of said insert 37, and the lower end of said ram is formed with a hemispherical recess therein into which the hemispherical portion of said insert fits closely with the truncated cone portion extending downwards beyond the lower end of said ram 39.

The shrouding member 40 is biased downwards relative to said ram 39, by means of a spring 42, to a limiting position determined by a diametrical pin 43 carried by said ram engaging the upper ends of diametrical opposite vertical slots 44 in the wall of said shrouding member, and, at the starting stage of the cycle of operations, the shrouding member is at this limiting position, and the bottom thereof is just about level with the bottom of said insert 37. This is the position shown in FIGURE 11.

It will be seen that, as in the embodiment of FIGURES 1 to 5, the bore hole of the shrouding member is of greater diameter than the die hole and that the die hole is of slightly reduced diameter at its upper extremity.

In operation, the insert 37 having been fitted in the lower end of the ram 39 as described, and the plate 36 having been placed on the top of the die 38 as shown, the ram 39 is moved downwards and carries the shrouding member 40 with it. When the bottom surface of the shrouding member 40 engages the top surface of the plate 36 it is arrested and said ram 39 continues to descend, and the insert 37 or the lower portion thereof apparently flows in the manner of a liquid and fills the space within the bore hole 41 as shown in FIGURE 13. As the ram 39 continues to descend, it appears that the pressure exerted hydrostatically by said insert behaving as a liquid causes a disc-shaped piece to be sheared out from said plate 36 into the die hole through which it falls, and the lower portion of the insert, now behaving in its normal manner as a resilient body, is forced through the hole in said plate and into the die hole. FIGURE 13 shows the position just as the insert 37 is in process of shearing the disc-shaped piece out of the plate 36 and FIGURE 14 shows the end product, and it will be seen that, in like manner as the bush 8 of FIGURES 1 to 5, the insert 37 keys with the hole in the plate 36.

After the ram 39 has completed its descent, it is returned to the position of FIGURE 11 and the shrouding member 40 also returns to the position of FIGURE 7. As in the case of FIGURES 1 to 5, the die 38 consists of two parts which can be separated to release the insert 37.

Referring to FIGURE 11, it will be seen that the ram 39 is secured at its upper end to a head 45 through the medium of which said ram is reciprocated down and up. The spring 42 is in compression between said head and the shrouding member 40 and therefore, as before stated, biases said shrouding member downwards relative to said ram 39.

In the embodiments of FIGURES 1–5, 6–8 and 11–14, the insert is of circular section both before and after insertion. In the embodiment of FIGURES 9 and 10 the insert is initially of circular section, but after insertion the part thereof in and below the hole in the plate is of square section. Obviously the whole of the insert may be of square, rectangular or other non-circular section both before and after insertion. This, of course, involves the die hole, the hole in the shrouding member, and the descending ram being also of the required non-circular section. For example, if, in the case of the embodiment of FIGURES 11 to 14, a square section pad with a flat top and bottom is required, instead of the pad 37, the ram 39, the hole 41 in the shrouding member 40, and the die hole will all be of square section and the bottom surface of said ram 39 will be flat.

The application of the invention to composite inserts is not confined to an insert such as those considered with reference to FIGURES 1 to 10, in which the harder component extends from both ends of the softer bush. Thus, the harder component may terminate at the upper end of the surrounding softer component. Alternatively, the harder component may not project below the lower end of the softer component in which case initial piercing of the sheet will not occur. Again, a composite insert may comprise a plurality of harder components. For example, a plurality of inserts such as the one shown in FIGURE 9 might be integrated to form a rectangular bushing carrying a plurality of conductors 7. Such an insert may be inserted into an imperforate sheet of material in accordance with the method of the invention, employing a ram, shrouding member and die of suitable shape and dimensions. The modifications necessary to the inserting apparatus are thought to be sufficiently clear in view of the foregoing descriptions of specific embodiments as not to require detailed description.

A further variation arises in that the invention may be applied to the insertion of more than one individual insert simultaneously. For example, FIGURES 15 and 16 show a holder assembly for a standard cartridge fuse 50. This assembly comprises a pair of spaced inserts each consisting of a relatively soft bush 51 inserted in a relatively hard plate 52 and carrying a spring clip 53. It will be noted that the clip 53 comprises a middle stem portion embedded in the lower part of the bush, said stem portion extending upwardly and being divided to form opposing fuse cap contact arms and extending downwardly and being again divided to form a pair of tabs which are bent over in opposite directions against the base of the bush 51. The spring clip 53 may be of Phosphor bronze and its contact arms lie in a correspondingly shaped cavity in the upper part of the bush, one side of said cavity being open to receive the fuse body.

FIGURE 17 shows said inserts located in apparatus for inserting them into the plate 52 in accordance with the method of the invention, the open sides of the bush cavities facing each other. Only that part of the apparatus is shown which differs from apparatus previously described. Each insert is located in a bore 54 in a shrouding member 55, said member overlying the imperforate plate 52 which, in turn, overlies a die 56. The die has two die holes 57, each co-axial with one of the bores 54 in the shrouding member. Above each set of aligned bores 54, 57 is a ram 58 which is co-axial with its associated bore 54 in the shrouding member and is adapted for a close sliding fit in said bore. The lower end 59 of each ram is shaped complementarily to the shape of the underlying bush cavity and is in the form of a peg which is off-set from centre so as to fill also the open side of the bush cavity. These ends are also recessed to fit over the roots of the contact arms of the clip 53.

In operation, the rams 58 are lowered so that the ram ends 59 fill the bush cavities of the two inserts and the unreduced sections of the rams enter and close the bores 54 in the shrouding member. Thereafter, hydrostatic pressure is exerted by the inserts on the plate 52 until a piece is pressed out from below each insert into the associated die hole 57. The inserts then move through the plate to the position indicated in FIGURE 18. Other details of the construction and operation of the apparatus are similar to those of the aforedescribed embodiments.

It will be seen that the invention is applicable to inserts which are homogenous or consist of materials of similar hardness or to composite inserts having components of widely differing hardness and permits such inserts to be inserted in an imperforate sheet of material in a single operation with substantially no permanent distortion of the upper end of the insert. For the avoidance of doubt, it is to be understood that an imperforate sheet is one which is not perforated in that area in which the insert is to be inserted, regardless of perforations in other areas. Furthermore, the term sheet is intended to include small areas of bodies which are not themselves sheets (e.g. the side of a box or a flange of a bracket).

I claim:

1. The method of inserting into a sheet of material an insert made at least partially of a material more elastic than that of said sheet, which method comprises the steps of placing an end of said insert comprising said elastic material near one side of said sheet and exerting pressure on said insert in the direction of said sheet while sealingly confining the material of said insert against both flow laterally of said insert and flow away from said sheet, and supporting an area on the other side of said sheet which encircles an area in alignment with said insert, thus forcing a first portion of said insert through said sheet to form a hole therein, while leaving a second portion within said hole, said supported area extending inwardly toward the center of the area in alignment with said insert so far that it prevents the formation of a hole as large in all its transverse dimensions as the original cross-section of at leat one of said portions, whereby said last mentioned insert portion is compressed in cross-section as it enters said hole.

2. The method claimed in claim 1 according to which said first portion is compressed and expands toward its original cross-section after leaving said hole.

3. The method claimed in claim 1 according to which said second portion is compressed and remains in compression within said hole.

4. The method claimed in claim 1 according to which said encircled area is polygonal.

5. The method claimed in claim 1 according to which said encircled area is smaller in diameter than the cross-section of at least one of the portions of said insert driven into said hole.

6. The method claimed in claim 1 according to which said insert material is sealingly confined by means making substantially line contact with said sheet along a continuous ring encircling said insert.

7. The method claimed in claim 1 according to which said insert shears a slug from said sheet as it is inserted therein.

8. The method claimed in claim 1 according to which said insert is an electric terminal seated in an elastic bushing.

9. A method as claimed in claim 1 in which said more elastic material is a plastic insulating material.

10. A method as claimed in claim 9 in which said elastic insulating material is nylon.

11. A method as claimed in claim 9 in which said elastic insulating material is polytetrafluoroethylene.

12. A method as claimed in claim 9 in which said elastic insulating material is polypropylene.

13. The method of inserting into a sheet of material an insert made at least partially of a material more elastic than that of said sheet, which method comprises the steps of placing an end of said insert comprising said elastic material near one side of said sheet and exerting pressure on said insert in the direction of said sheet while sealingly confining the material of said insert against both flow laterally of said insert and flow away from said sheet, and supporting an area on the other side of said sheet which encircles an area in alignment with said insert, thus forcing said end of said insert through said sheet to form a hole therein, which is filled by said insert, said supported area extending inwardly toward the center of the area in alignment with said insert so far that it prevents the formation of a hole as large in all its transverse dimensions as the original cross-section of at least a portion of that part of said insert which enters said hole, whereby said insert portion is compressed in cross-section as it enters said hole.

14. The method claimed in claim 13 according to which said insert is preformed to a desired shape, and substantially uniform pressure is simultaneously applied to all surface portions of the end of said insert facing away from said sheet.

15. A method of inserting into a plate-like member an insert having a body part made of material which is more elastic than that of said plate-like member and a relatively narrow member made of material which is substantially rigid under said pressure, said relatively narrow member projecting fom said body part, said method comprising the steps of locating the insert adjacent one surface of an initially imperforate portion of the plate-like member so that the narrow member projects from said body part towards said surface, forcing the relatively narrow member against said surface and thence through the plate-like member, confining said body part adjacent said surface within a shrouding means, producing a continuous, substantially thin-line pressure-sealing contact around the insert between the shrouding means and said surface, and exerting pressure on said body part to force it against said surface to sever a slug from the plate-like member which is replaced by said insert.

16. A method of inserting into a plate-like member an insert having a body part made of material which is more elastic than that of said plate-like member and a relatively narrow member made of a material which is substantially rigid under said pressure, said relatively narrow member projecting from said body part, said method comprising the steps of locating the insert adjacent one surface of the plate-like member so that said relatively narrow member projects from said body part towards said surface, locating a die aperture of an apertured die means in alignment with the insert adjacent a second surface of the plate-like member, said second surface being oppositely disposed from said one surface, confining the insert adjacent said one surface within a shrouding means, forcing the relatively narrow member against said one surface and thence through the plate-like member, the step of producing a pressure sealing contact around said body part between the shrouding means and said one surface, and forcing said body part against said one surface to sever a slug of the plate-like member into the die aperture and thence force said body part into the plate-like member.

17. The process of inserting into a sheet of material a preformed insert at least a portion of which is elastically deformable under the pressure applied thereto, said process comprising the steps of locating the insert with said deformable portion adjacent one surface of the sheet, locating a die aperture of an apertured die means in alignment with the insert and adjacent the opposite surface of the sheet, exerting pressure on the insert in the direction of the sheet while confining the deformable portion of said insert both against flow laterally of said insert and flow away from said sheet within shrouding means which is simultaneously urged into continuous, sharp, pressure-sealing line contact with said one surface, thus elastically deforming and forcing a first part of said deformable portion of said insert through said sheet into said die aperture and elastically deforming and forcing a second part of said deformable portion of the insert into said sheet, and releasing said first insert part from said die, said die aperture having a cross-sectional area so small that it prevents the formation of a hole in said sheet as large in all its transverse dimensions as the original cross-section of said first and second insert parts, so that said first and second insert parts are compressed in cross-section during said pressure-exerting step, and said deformable portion having an elasticity sufficient to cause the first part thereof to expand toward its original cross-section when released from said die, so that those portions of said insert external to said sheet have approximately their original shape upon completion of said process.

18. A method as claimed in claim 17 in which said elastic material is a plastic insulating material.

References Cited
UNITED STATES PATENTS

| | | | |
|---|---|---|---|
| 1,128,532 | 2/1915 | Schmidt | 29—432 |
| 2,244,073 | 6/1941 | Lyon | 29—432.1 |
| 2,275,438 | 3/1942 | Hothersall | 29—432 |
| 2,319,234 | 5/1943 | Hothersall. | |
| 2,593,506 | 4/1952 | Wales | 29—432 |
| 2,911,460 | 11/1959 | Oxley. | |
| 2,995,617 | 8/1961 | Maximoff et al. | |
| 3,180,009 | 4/1965 | Lenz | 29—432 X |

CHARLIE T. MOON, *Primary Examiner.*

WHITMORE A. WILTZ, *Examiner.*